United States Patent [19]

Levinson

[11] Patent Number: 4,717,230

[45] Date of Patent: Jan. 5, 1988

[54] OPTICAL ERASER AND NODE SWITCH FOR AN OPTICAL NETWORK

[75] Inventor: Frank H. Levinson, Redwood City, Calif.

[73] Assignee: AMP Incorporated, Harrisburg, Pa.

[21] Appl. No.: 750,811

[22] Filed: Jun. 28, 1985

[51] Int. Cl.⁴ .......................... G02B 6/26; G02B 6/42
[52] U.S. Cl. .................................................. 350/96.15
[58] Field of Search ...................................... 350/96.15

[56] References Cited

U.S. PATENT DOCUMENTS

| | | | |
|---|---|---|---|
| 4,011,543 | 3/1977 | Soref et al. | 340/166 R |
| 4,013,000 | 3/1977 | Kogelnik | 350/96 C |
| 4,153,329 | 5/1979 | Gillette | 350/96.13 |
| 4,315,666 | 2/1982 | Hicks, Jr. | 350/96.15 |
| 4,342,499 | 8/1982 | Hicks, Jr. | 350/96.15 |
| 4,360,247 | 11/1982 | Beasley | 350/96.15 |
| 4,387,954 | 6/1983 | Beasley | 350/96.15 |
| 4,453,802 | 6/1984 | Bridges et al. | 350/96.15 |
| 4,471,474 | 9/1984 | Fields | 367/149 |
| 4,477,725 | 10/1984 | Asawa et al. | 350/96.15 |
| 4,482,203 | 11/1984 | Stowe et al. | 350/96.15 |
| 4,493,528 | 1/1985 | Shaw et al. | 350/96.15 |
| 4,552,026 | 11/1985 | Knudsen et al. | 350/96.15 |
| 4,556,279 | 12/1985 | Shaw et al. | 350/96.15 |
| 4,564,262 | 1/1986 | Shaw | 350/96.15 |
| 4,593,968 | 6/1986 | Giallorenzi | 350/96.15 |

OTHER PUBLICATIONS

Findakly, Talal and Chen, Chin-Lin, "Optical Directional Couplers With Variable Spacing", *Applied Optics*, vol. 17, No. 5, Mar. 1, 1978, pp. 769–773.
Parriaux, O.; Bernoux, F. and Chartier, G., "Wavelength Selective Distributed Coupling Between Single Mode Optical Fibers for Multiplexing", *Journal of Optical Communications*, vol. 2, No. 3, 1981, pp. 105–109.
Alferness, R. C. and Schmidt, R. V., "Tunable Optical Waveguide Directional Coupler Filter", *Applied Physics Letters*, vol. 33, No. 2, Jul. 15, 1978, pp. 161–163.
Miller, Stewart E., "Some Theory and Applications of Periodically Coupled Waves", *The Bell System Technical Journal*, Sep. 1969, pp. 2189–2219.
Digonnet, Michael and Shaw, H. J., "Wavelength Multiplexing in Single-Mode Fiber Couplers", *Applied Optics*, vol. 22, No. 3, Feb. 1, 1983, pp. 484–491.
Alferness, R. C. and Cross, Peter S., "Filter Characteristics of Codirectionally Coupled Waveguides with Weighted Coupling", IEEE *Journal of Quantum Electronics*, vol. QE-14, No. 11, Nov. 1978, pp. 843–847.
Kogelnik, H., "Filter Response of Nonuniform Almost-Periodic Structures", *The Bell System Technical Journal*, vol. 55, No. 1, Jan. 1976, pp. 109–126.

*Primary Examiner*—William L. Sikes
*Assistant Examiner*—Robert E. Wise

[57] ABSTRACT

An optical energy eraser is implemented by the controlled movement of an optical fiber and an optical absorber into close proximity to permit coupling of energy between them. The eraser is used in conjunction with two optical switches to implement a node switch useful for optical fiber networks. An integrated optic implementation permits analogous results by a controlled change in the properties of the region separating a waveguide from an optical absorber so that significant coupling occurs between them.

12 Claims, 4 Drawing Figures

4,717,230

OPTICAL ERASER AND NODE SWITCH FOR AN OPTICAL NETWORK

FIELD OF THE INVENTION

This invention relates to optical networks and to functional waveguide elements useful for node switching in such a network.

BACKGROUND OF THE INVENTION

An optical fiber is a typical example of a waveguide and the invention is described herein illustratively in terms of such a fiber. Fiber optic networks are knwon to be highly desirable. Because of the expected cost effectiveness of such systems and the high information handling capabilities, fiber optic networks are the subject of considerable interest and effort in the industry. Unfortunately, various components necessary for implementing such a system have proven to be illusive. One such component is a node switch. A typical fiber optic system requires a relatively large number of node switches in a series or ring type organization. But commercially available node switches adapted to connect and disconnect nodes, at present, are lossy. Consequently, the number of nodes which can be connected into a ring is limited.

BRIEF DESCRIPTION OF THE INVENTION

The present invention employs the controlled coupling between an optical fiber and an optical absorber to absorb light energy and information being carried by the fiber. An information carrying optical fiber and an eraser are installed in closely spaced opposing positions on facing portions of the internal surface of a hollow quartz sleeve. The facing portion of the fiber has its cladding reduced in thickness or removed to foster energy coupling. The eraser is a block of quartz having characteristics to absorb light energy. The sleeve is filled with a fluid (liquid or gas) having an index of refraction equal to or less than the cladding of the fiber. An actuator such as a piezoelectric element is disposed on the external surface of the sleeve to apply a force to the sleeve when activated. The force reduces the separation between the fiber and the eraser from a first position at which only negligible coupling occurs to a closer spacing at which essentially all optical energy is absorbed. An optical eraser is thus implemented.

The fiber included within the sleeve is the fiber which connects one node to another. Second and third fibers, connected to a receiver node and from a transmitter node respectively, are coupled to the first fiber on first and second sides of the eraser by means of first and second switches. A switch operative in this manner is fully disclosed in my copending application Ser. No. 750,805, entitled "Optical Switch Arrangement" and filed on even date herewith. Such a switch employs two fibers instead of a fiber and an absorber. The separation between the two fibers is controlled by a pressure transducer. Only when the fibers are forced into close proximity does information switch from one fiber to another. The arrangement of two switches separated by an optical eraser connected as described provides a functional node switch for an optical fiber network. Particularly, when such elements share a common support, a convenient functional network component is provided.

DETAILED DESCRIPTION

Figure 1:
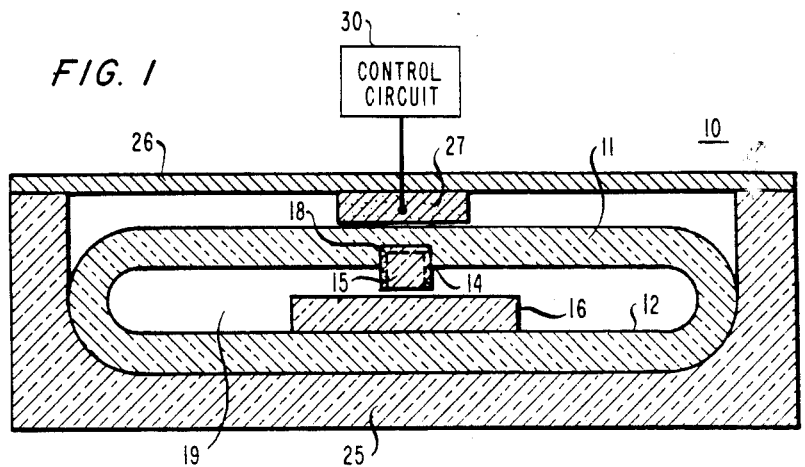
FIG. 1 is a cross-sectional view of an eraser in accordance with one aspect of this invention.

FIG. 1 is a cross sectional view of an optical energy eraser 10 suitable for use in an optical network in accordance with one aspect of this invention. The eraser comprises a sleeve 11 having an internal surface 12. The vertical dimension of sleeve 11 as viewed in the figure, is relatively small to bring top and bottom portions of surface 12 into closely spaced apart positions. The top portion includes longitudinal slot 14 in which optical fiber 15 is secured. A relatively large volume quartz block 16 is fixed in position opposite fiber 15 as shown in the figure.

Fiber 15 is shown as having a relatively large core 17 (diameter=100 microns) and a cladding 18 (diameter=140 microns) shown absent in the area opposite block 16. The sleeve includes an open area 19 which, in the illustrative embodiment includes a liquid with an index of refraction equal or less than that of cladding 18. The sleeve is sealed at both ends in a manner to contain the liquid yet permit fiber 15 to extend beyond the sleeve.

The sleeve is supported by a rigid support member 25 to which rigid bridge 26 also is secured. Pressure element 27 is suspended from bridge 26 and is adapted to apply pressure to the sleeve in a manner to move fiber 15 and block 16 towards one another. Initially, fiber 15 is on the order of forty microns from block 16. When pressure element 27 applies pressure to the sleeve, fiber 15 is moved into contact with block 16.

Element 27 conveniently comprises a piezoelectric element operative to apply eight to sixteen oounces of force against sleeve 11 in response to a command signal. Control circuit 30 is operative to apply such a (steady state) voltage to element 27 to produce the force when required.

Figure 2:
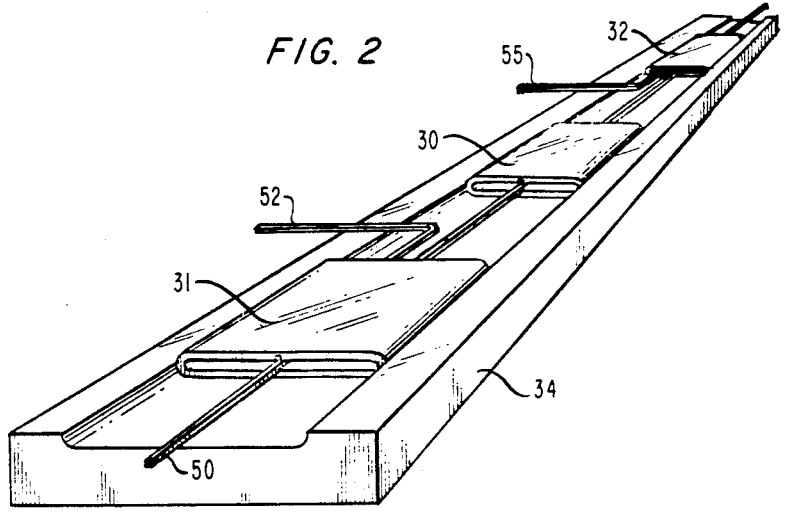
FIG. 2 is a projection view of a node switch in accordance with another aspect of the invention employing the eraser of FIG. 1.

Eraser 10 is utilized conveniently with switches disclosed in copending application Serial No. 750,805. FIG. 2 shows such an arrangement in which the positions of an eraser 30 and first and second sleeve switches 31 and 32 share a common support member 34. Separate pressure elements (not shown in FIG. 2) are used as shown in FIG. 1. A common circuit operates the two switches and the eraser to form a node switch.

Figure 3:
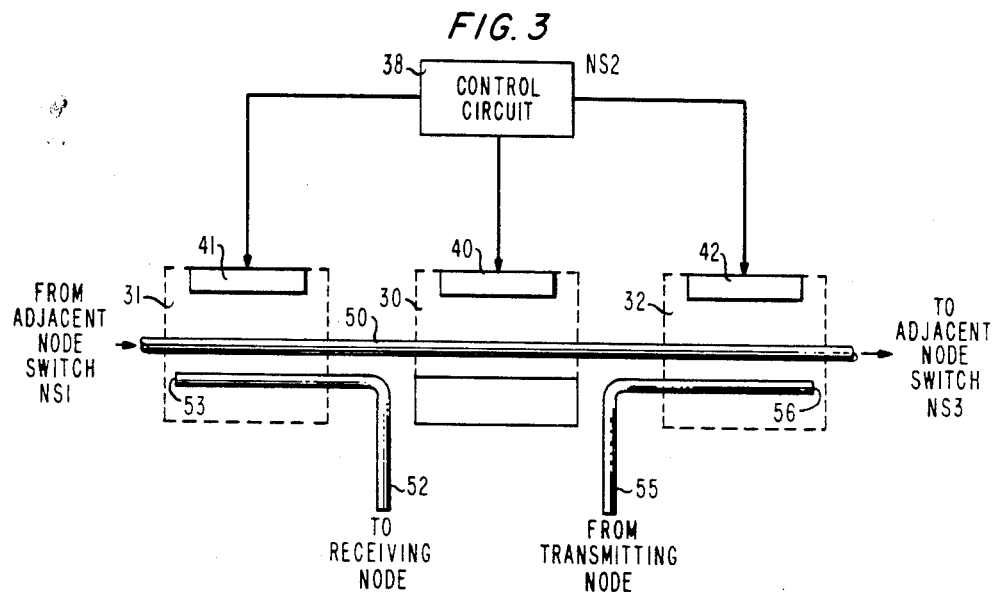
FIG. 3 is a schematic representation of the node switch of FIG. 2.
Figure 4:
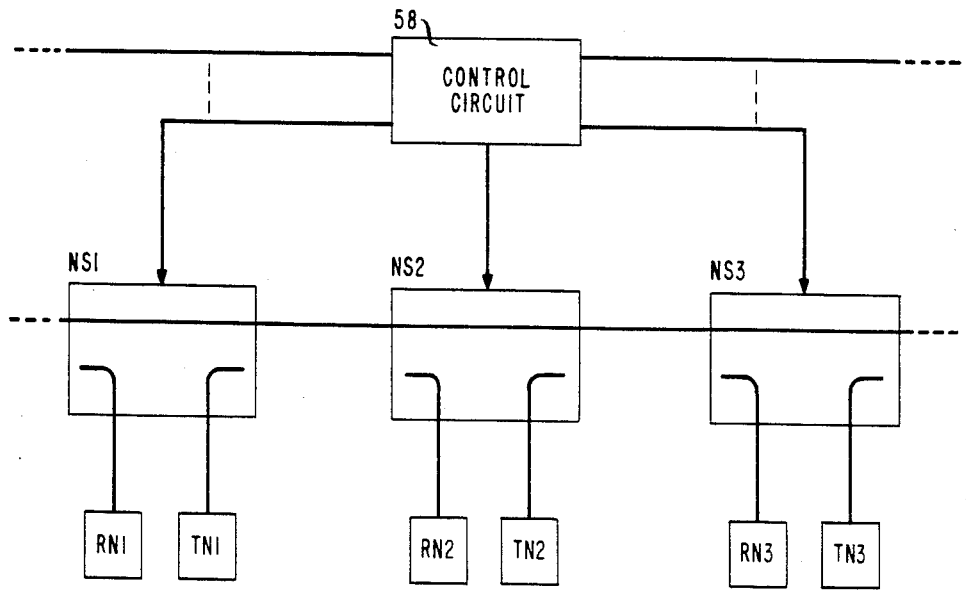
FIG. 4 is a schematic representation of a portion of a fiber optic network including node switches of the type shown in FIGS. 2 and 3.

FIG. 3 shows a schematic representation of the node switch of FIG. 2 showing the various components of the node switch with a common control circuit 38. The node switch as shown in FIG. 4 comprises eraser 30 and switches 31 and 32 of FIG. 2 with pressure transducers 40, 41 and 42 of eraser 30 and switches 31 and 32 respectively. The three components share a common optical fiber 50 also connected between adjacent node switches as indicated. Three adjacent node switches are designated NS1, NS2, and NS3 for convenience. Switch 31 of node switch NS2 includes an additional fiber 52. Fiber 52 is sealed within the sleeve of switch 31 at one end 53 as shown, but extends beyond the sleeve at the other end terminatng at a receiving node. Similarly, switch 32 includes an additional fiber 55. Fiber 55 also terminates within the sleeve of switch 32 at end 56, originating from a transmitting node at the other end.

FIG. 4 shows the overall organization of three node switches NS1, NS2 and NS3 with respective receiving and transmitting nodes and a control circuit 58. The receiving and transmitting nodes are deisgnated RN1, RN2 and RN3, and TN1, TN2 and TN3 for node switches NS1, NS2 and NS3 respectively. The operation of a node switch of FIG. 2 and 3 is now described in the context of the portion of a network described in connection with FIG. 4.

The network operates to route information carried by a light beam much as railroad cars are switched from track to track. Accordingly, if fiber 50 of FIG. 3 is visualized as a railroad track and if information in the fiber is visualized as a train, node switch NS2 of FIG. 3 operates to route a train on track 50 to track 52 and to switch a train on track 55 to track 50. If tracks 52 and 55 are visualized as leading to a railhead and originating at a railhead respectively, the operation is operative to take a train out of service and to substitute a new train.

The control signals to control such an operation would be operative to close switch 41 and switch 42 and to deactivate the train on track 52 and activate the train on track 55. Of course this is just an analogy and information carried by an energy beam is not divided into a physical package such as a train. Thus, each node switch requries an optical energy absorber to extinguish any optical energy (viz: any train) not switches. Accordingly, a node switch utilizes steady state voltages applied to piezoelectric transducers to physically move adjacent fibers into close proximity in switches 31 and 32, and to move a fiber and absorber closer together in eraser 30. The voltage signals operate to isolate nodes NS1 and NS3 from one another and to connect RN2 and TN2 of FIG. 4 to nodes NS1 and NS3, respectively.

The invention has been described in terms of an optical fiber embodiment. But the invention can be implemented with an integrated optic circuit as well. In an integrated optic implementation, no physical components actually move. Instead, a waveguide and an absorber are separated by a region of the circuit which is capable of having its optical properties changed controllably. Copending application Ser. No. 750,805 entitled "Optical Switch Arrangement" describes details of an analogous integrated optic switch which are applicable to integrated optical eraser design in accordance with this invention.

What is claimed is:

1. Apparatus comprising a hollow sleeve having a longitudinal axis and an internal surface, said sleeve having a cross-sectional geometry normal to said axis such that at least first and second portions of said internal surface are closely juxtaposed with one another, said first portion including means parallel to said axis for securing a waveguide, said apparatus including a waveguide secured by said means, said waveguide protruding beyond said sleeve, said apparatus further including absorber means adapted for absorbing optical energy from said waveguide when moved into close proximity therewith, said absorber means being connected to said second portion of said internal surface, said absorber means being completely located within said hollow sleeve, said sleeve being of a geometry such that said absorber means and said waveguide are normally spaced apart a distance such that said absorber means normally absorbs only negligible energy from said waveguide.

2. Apparatus in accordance with claim 1 wherein said waveguide comprises an optical fiber, said apparatus including transducer means responsive to a control signal for moving said fiber and said absorber into close proximity.

3. Apparatus in accordance with claim 2 wherein said transducer means comprises a piezoelectric element adopted for applying pressure to said sleeve responsive to a steady state voltage, said apparatus also including a control circuit for applying said voltage.

4. Apparatus in accordance with claim 3 wherein said optical fiber includes a core and a cladding, said cladding being at least reduced in thickness in an area within said sleeve facing said absorber.

5. Apparatus in accordance with claim 4 wherein said cladding is removed in said area.

6. Apparatus in accordance with claim 4 wherein said sleeve is sealed at both ends thereof and is filled with a fluid having an index of refraction equal to that of said cladding or lower.

7. Apparatus in accordance with claim 6 wherein said fluid is a liquid.

8. A node switch for an optical fiber network, said node switch comprising first and second switches and an optical eraser, said first switch, said optical eraser and said second switch being coupled to a first optical fiber in sequence, said first and second switches including a second and third optical fiber, respectively, wherein first ends of said second and third optical fibers are sealed within said first and second switches, and wherein second ends of said second and third optical fibers extend beyond said first and second switches, said node switch including control means for controllably activating said first and second switches and said eraser.

9. A node switch in accordance with claim 8 wherein said first and second switches and said eraser are mounted on a common support.

10. A plurality of node switches in accordance with claim 8, each of said switches being coupled to said first optical fiber and a control circuit for selectively activating said switches, each of said switches including said second and third optical fiber wherein said second ends of said fibers are coupled to respective receiving and transmitting nodes.

11. An optical eraser comprising an optical fiber and an optical absorber in a spaced-apart first position separated by a medium, only negligible coupling occurring between said optical fiber and said absorber when in said first position, said medium having optical properties to act as a cladding for said optical fiber, said eraser also including means for altering said medium controllably in a manner to change the coupling between said optical fiber and said absorber, said altering means including transducer means responsive to a control signal for selectively moving said optical fiber and said absorber into a second position, said optical fiber and said absorber being closer together in said second position than in said first position, whereby substantial coupling occurs between said optical fiber and said absorber when in said second position.

12. An integrated optical eraser, comprising an integrated optical wave guide and an integrated optical absorber, said waveguide and said absorber being separated by a medium having optical properties to act as a cladding for said waveguide, said optical eraser further comprising control element means for selectively controlling the optical properties of said medium to switch between a first state in which insignificant coupling occurs between said waveguide and said absorber and a second state in which substantialy coupling occurs between said waveguide and said absorber.

* * * * *